Figure 10:
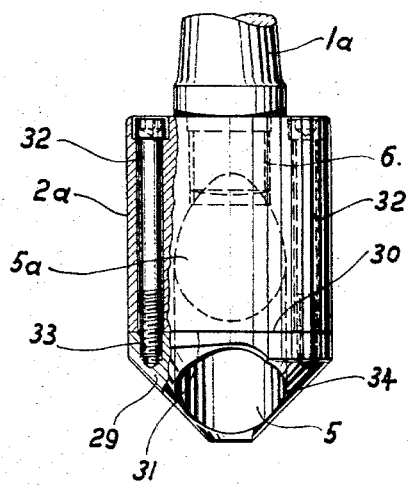

May 3, 1966  R. BREUNING  3,248,975
COUNTER-SINKING AND BURR-REMOVING TOOL
Filed Jan. 6, 1964 5 Sheets-Sheet 1
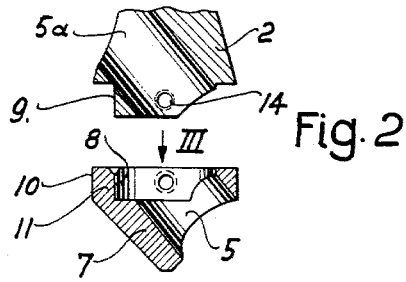
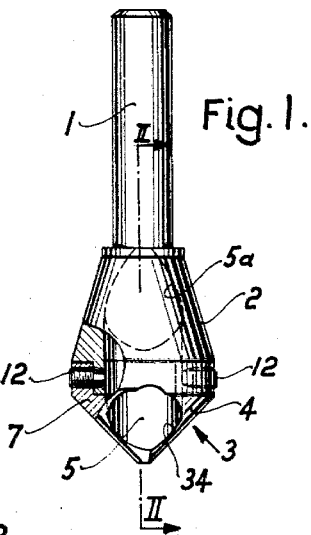
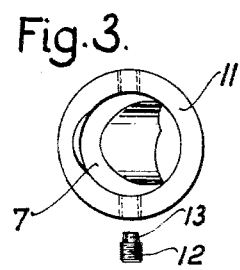
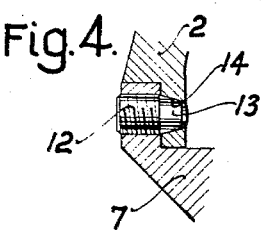
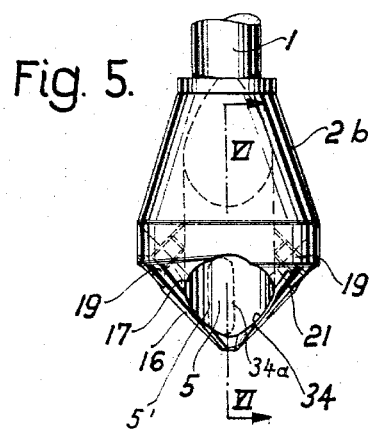
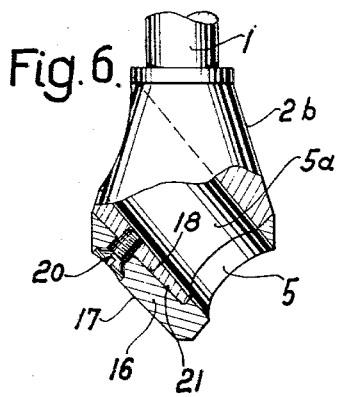
INVENTOR.
ROBERT BREUNING
BY
Woodhams, Blanchard and Flynn
ATTORNEYS

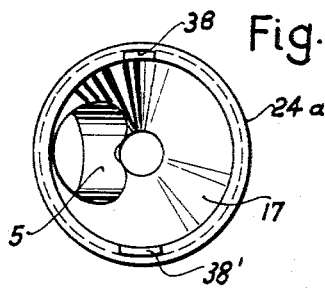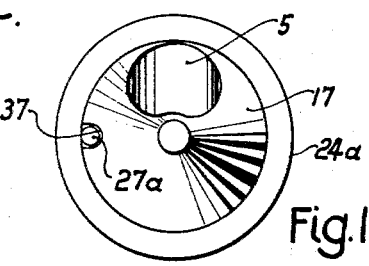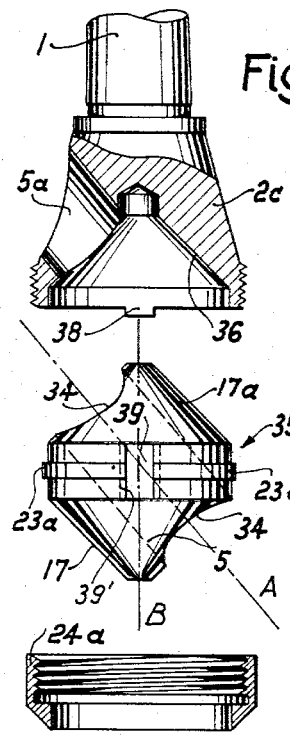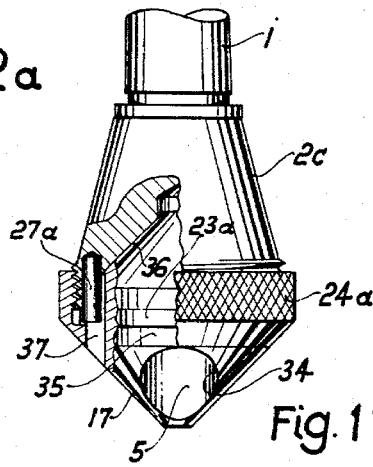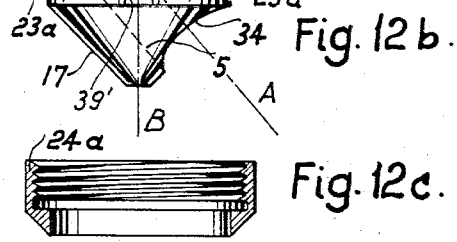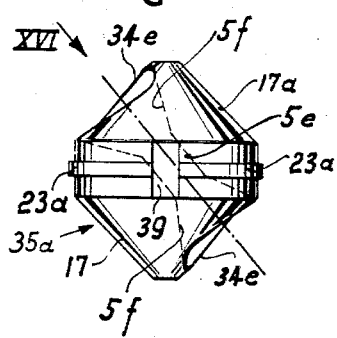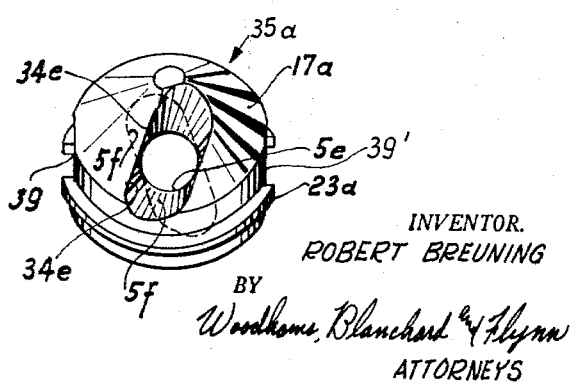

May 3, 1966 R. BREUNING 3,248,975
COUNTER-SINKING AND BURR-REMOVING TOOL
Filed Jan. 6, 1964 5 Sheets-Sheet 4
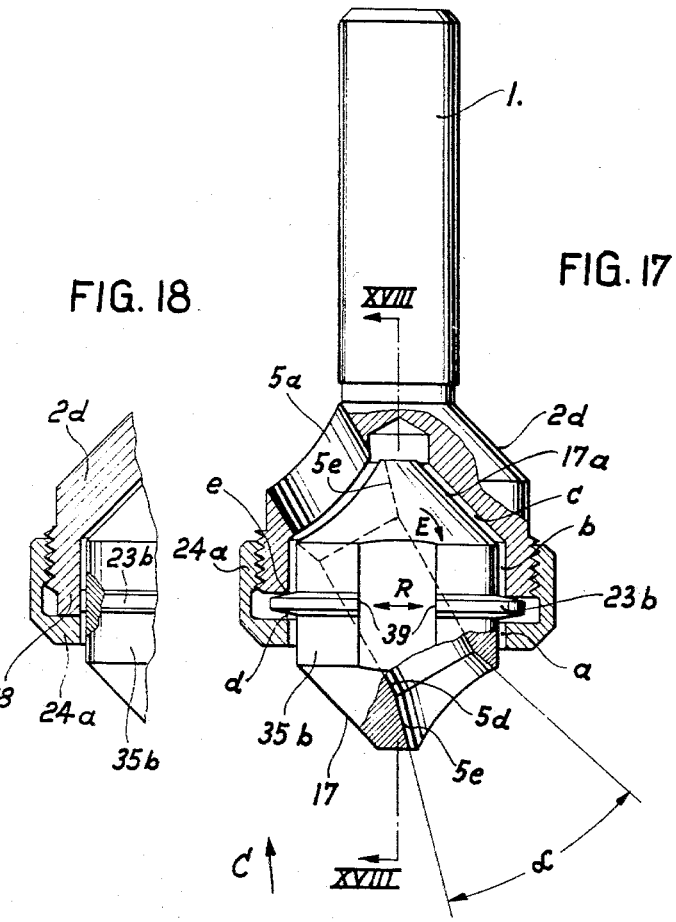
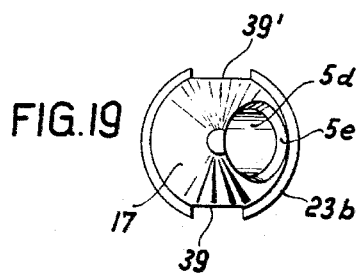
INVENTOR.
ROBERT BREUNING
BY
Woodhams, Blanchard & Flynn
ATTORNEYS

*INVENTOR.*
ROBERT BREUNING
BY
Woodhams, Blanchard & Flynn
*ATTORNEYS*

United States Patent Office 3,248,975
Patented May 3, 1966

3,248,975
COUNTER-SINKING AND BURR-REMOVING TOOL
Robert Breuning, 58 Hauptstrasse, Besigheim
(Neckar), Germany
Filed Jan. 6, 1964, Ser. No. 336,004
Claims priority, application Germany, Sept. 20, 1963,
B 73,587
7 Claims. (Cl. 77—73.5)

This invention relates to a counter-sinking and burr-removing tool comprising a shaft on which is mounted a head that ends in a cone and has at least one cutting edge on the conical surface of the head. The cone of such a tool may have passage inclined to its axis, or be milled in an equivalent manner, to provide a cutting edge. A plurality of cutting edges may however be provided on the conical surface. Such counter-sinking and burr-removing tools have previously been made in one piece from high-speed steel. In the case of counter-sinking tools having a head of large diameter a saving in material has been effected by making only the counter-sinking head from high-speed steel, the shank being made from steel of lower quality and being screwed to the head. In any case, however, with such counter-sinking tools the quantity of high-speed steel used and hence the cost of materials is very high since it has been necessary to make at least the whole of the counter-sinking head from high-speed steel.

The invention is based on the conception of making only the cutting part of the counter-sinking head from tool steel. Accordingly, in accordance with the invention the cone that serves as the cutting member in a counter-sinking and burr-removing tool consists of a cutting material such for example as high-speed steel or hard metal and forms an exchangeable cutting cone, whereas the head portion consists of steel of lower quality and is connected to the cutting cone by screwing.

In a particularly advantageous form of the invention the exchangeable cutting member is formed as a double cone having at least one cutting edge on each conical surface. In order to mount this double cone a corresponding conical recess is provided in the head portion. As compared with a cutting member in the form of a single cone the cutting member of double conical form has the advantage of being utilized very economically and that the additional expenditure on materials and manufacture is relatively low. The cutting member of double conical form is likewise releasably connected to the head portion by screwing, and when the cutter of one cone has been used up the cutting member can be reversed and still be used.

The construction of the counter-sinking and burr-removing tool in accordance with the invention results in very great saving, up to 80%, of tool steel that would otherwise be required, so that the manufacturing costs associated with such tools are very considerably reduced.

Figure 9:
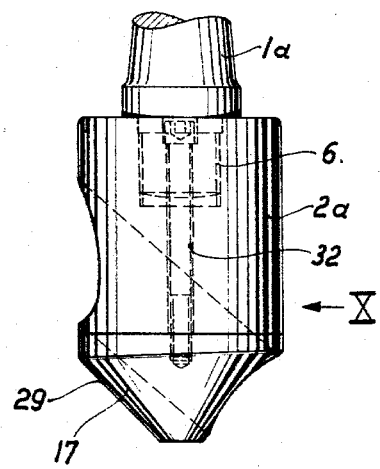
Figure 7:
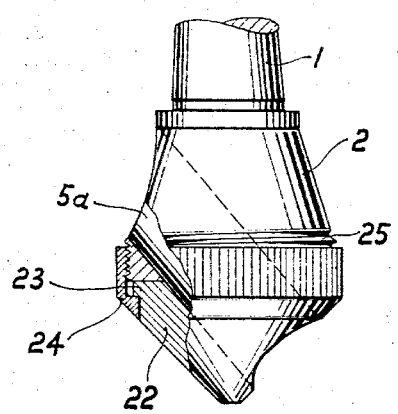
Figure 8:
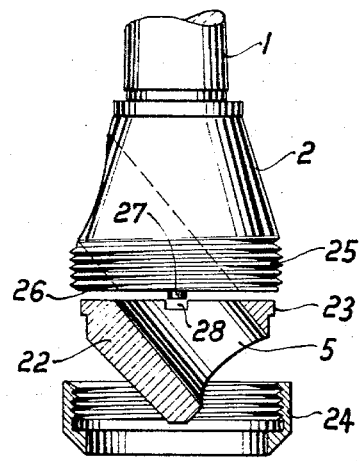
Figure 21:
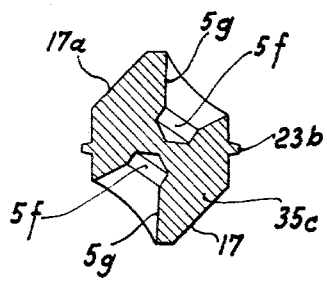
Figure 22:
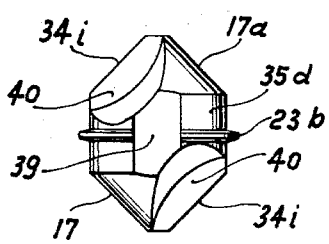
Figure 20:
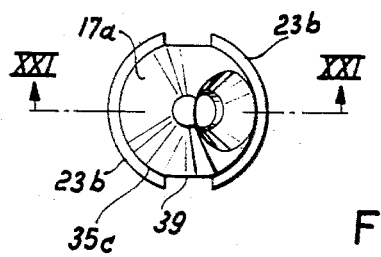
Figure 23:
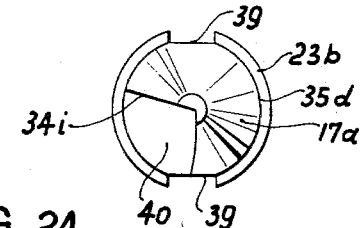
Figure 24:
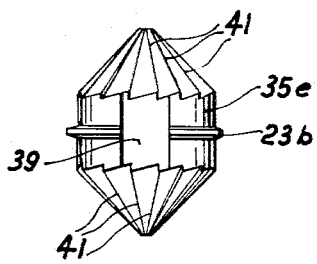

Some embodiments of the invention will now be described by way of example with reference to the accompanying drawings, in which FIG. 1 is a side view, partly in section, of a counter-sinking and burr-removing tool according to the invention, FIG. 2 shows separated parts of this tool in section on the line II—II of FIG. 1, FIG. 3 is a plan view of the cutting cap of the tool, looking in the direction III of FIG. 2, FIG. 4 is a sectional view of part of the tool shown in FIG. 1, on a larger scale, FIG. 5 is a side view of another embodiment of the invention, FIG. 6 is a vertical section on the line VI—VI of FIG. 5, FIG. 7 is a side view, partly in section, of another embodiment of the invention, FIG. 8 shows separated parts of the tool shown in FIG. 7, partly in section, FIG. 9 is a side view of another embodiment of the invention, FIG. 10 is a side view, partly in section, of the tool shown in FIG. 9, looking in the direction X of FIG. 9, FIG. 11 is a side view, partly in section, of another embodiment of the invention, FIGS. 12a to 12c show the individual parts of the tool shown in FIG. 11, but with some modifications, FIG. 13 is an end view of the tool shown in FIG. 11, FIG. 14 is an end view of the tool shown in FIG. 12a, FIG. 15 is a side view of a cutter of double conical form according to the invention, FIG. 16 is a diagrammatic view of the double cone of FIG. 15, looking in the direction XVI of FIG. 15, FIG. 17 is a side view, partly in longitudinal section of another embodiment of the invention having a cutter of double conical form, FIG. 18 is a part sectional view on the line XVIII—XVIII of FIG. 17, FIG. 19 is an end view of the double cone, looking in the direction C of FIG. 17, on a smaller scale than FIG. 17, FIG. 20 is a similar view to FIG. 19, of another form of double cone, FIG. 21 is a sectional view on the line XXI—XXI of FIG. 20, FIG. 22 shows another form of double conical cutter, FIG. 23 is a plan view of the cutter shown in FIG. 22, and FIG. 24 is a side view of a double conical cutter in accordance with another embodiment of the invention.

In the drawings, the counter-sinking and burr-removing tool comprises a shank 1 with a head 2 mounted thereon, the head ending in a cone 3 and having a passage 5 passing through the conical surface 4 at an inclination to the axis of the tool. The shank 1, which may be cylindrical or be formed as a Morse taper may, as shown for example in FIGS. 1, 5 and 6 and also FIGS. 7 and 8, be made in one piece with the head 2. However, as illustrated in FIGS. 9 and 10 the shank 1a may have a pin 6 which is screwed into a corresponding axial screw-threaded bore in the counter-sinking head 2a, this arrangement being of particular advantage in the case of large tools used for counter-sinking large holes.

In all of the embodiments illustrated only the cutting cone of the counter-sinking head is made from high quality cutting material.

In the embodiment illustrated in FIGS. 1 to 3, the cutting cone 7 has an axial cylindrical recess 8 in which a corresponding cylindrical projection 9 on the head portion 2 engages. The foot of this cutting cone 7 is preferably of cylindrical form at its outer periphery, as shown at 10. This annular foot portion 11 of the cutting cone is provided with two radial diametrically opposite set screws 12 having pins 13 that engage in corresponding holes 14 in the cylindrical projection 9. The pins 13 of the set screws are advantageously of conical form. In the construction shown these conical pins 13 of the set screws engage in corresponding conical holes 14 in the projection 9.

In the embodiment illustrated in FIGS. 5 and 6 the cutting cone consist of a cap 16 pressed from sheet tool steel, the outer and inner surfaces 17 and 18 of which are conical. This construction permits of particularly economical manufacture of the cutting cone formed as a cap, with minimum expenditure on material. The cutting cap 16 is connected to a head portion 2b by screws 19 and 20 countersunk into the cutting cone 17. The head portion 2b has a conical end surface 21 corresponding to the internal conical surface 18 of the cutting cap.

In all of the embodiments shown in FIGS. 1 to 20 the cutting cone is so arranged in relation to the head portion that the inclined passage 5 in the cutting zone is in alignment with an inclined passage 5a provided in the head portion 2 to 2d.

In the embodiment shown in FIGS. 7 and 8 the cutting cone 22 has at the base of the cone a cylindrical flange 23, and there is provided an annular cap nut 24 that engages over the flange 23 to secure the cutting cone 22 to the head portion 2, which is formed with a corresponding external screwthread 25. In order to secure the two parts 2 and 22 against rotation a pin 27 set into the flat end 26 of the head portion 2 engages in a corresponding recess 28 in the cutting cone 22.

The embodiment illustrated in FIGS. 9 and 10 is particularly suitable for counter-sinking holes of large diameter. In this tool, the cutting cone 29 and head portion 2a have flat end surfaces 30 and 31, respectively, in engagement with one another, the cone and head portion being connected together by two axial bolts 32 arranged in the head portion 2a on both sides of the inclined passage 5, 5a and engaging in elongated screwthreaded holes 33 in the cutting cone 29.

In all the embodiments illustrated the conical surface 17 of the cutting cone is ground in such manner that the interpenetration of the inclined passage 5 and the conical surface 17 forms a slightly projecting cutting edge 34.

In the embodiment illustrated in FIGS. 11 to 14, the cutting member is in the form of a double cone 35 with an inclined passage 5, there being a cutting edge 34 on each of the conical surfaces 17 and 17a. The axis A of the passage 5 cuts the axis B of the double cone. In order to mount this double cone the head portion 2C is provided with a corresponding conical recess 36. The double cone 35 may be connected to the head portion 2c in any suitable manner by screwing. In the present embodiment a cap nut 24a is provided and in FIGS. 7 and 8, the nut 24a engaging over a flange 23a provided on the double cone 35 and pressing the conical surface 17a of the double cone into the conical seat 36 in the head portion 2c. In this case also means are provided for preventing rotation, the said means consisting in FIGS. 11 and 13 of an axial pin 27a secured in the head portion 2 and engaging in an axial groove 37 provided on the periphery of the double cone 35.

In FIGS. 12a, 12b and 14, however, the means for preventing rotation comprise two lugs 38 and 38' on the periphery of the head portion 2c, these lugs fitting into corresponding grooves provided in the double cone 35 or in interruptions 39 and 39' of the flange 23a. As can be seen from the drawing, the lugs 38 and 38' and the grooves 39 and 39' are of different widths. This ensures that the double cone 35 can be inserted only in the correct position in the head portion 2c so that the passages 5 and 5a are in alignment.

In the above-described embodiments there is provided an inclined passage 5 which is of circular cross-section so that a semicircular cutting edge 34 is formed on the cutting cone. The working zone is limited substantially to the central part of this semicircular cutting edge.

In order to increase the size of the working zone of the cutting edge provided on the cutting cone, as shown in FIG. 5 by a broken line an aperture 5' is provided in the cutting cone 16, of such shape that a straight cutting edge 34a extending substantially along a generating line of the cone is formed on the conical surface 17.

Such a straight cutting edge 34e may be formed in similar manner in the case of the double conical cutter shown in FIGS. 15 and 16. In this case the double cone 35a has an aperture which at its central part 5e is cylindrical, both end portions of this aperture being widened, as indicated at 5f so that a straight cutting edge 34e is formed on both conical surfaces 17 and 17a, each cutting edge extending substantially along a generating line of the cone. The double cone shown in FIGS. 15 and 16 may be inserted into a head portion such as is shown in FIGS. 12a and 12c or FIGS. 17 and 18.

The following should be noted in connection with a counter-sinking and burr-removing tool having a cutting cone or double cone on the conical surface or each conical surface of which a cutting edge is formed by an inclined passage:

As a result of the undercutting of the cone required to form the cutting edge the apex of the cone becomes displaced from the axis of the tool. During counter-sinking, the hole in the workpiece to be counter-sunk centers itself on the under-cut cone of the counter-sinking tool, so that with this tool firmly mounted the workpiece is obliged to execute a circular movement. If the workpiece is heavy this circular movement is the cause of appreciable forces that act unfavourably on the mounting of the counter-sinking tool and also result in rapid wear of the cutter. Moreover, the quality of the counter-sink produced is adversely affected.

In order to overcome this drawback, in the embodiment illustrated in FIGS. 17 and 18, in which the cutting member 35b is secured against rotation in the head portion 2d, the cutting member is mounted in the head portion with radial play such that during the countersinking operation the axis of the cutting member 35b can shift relative to the axis of the head portion 2d and execute a circular movement around it. Advantageously, the cutting member 35b is furthermore so mounted with play in the head portion 2d that the axis of the cutting member can execute not only a circular movement relative to the axis of the head portion but can become inclined relative to the axis of the head portion so that the axis of the cutting member can perform an additional conical movement, or whirling movement. As can be seen in the drawing, suitable play for the above mentioned purpose is provided between the double cone 35b and the head portion 2d or cap nut 24a, as indicated at a, b and c. Furthermore, suitable play is also provided, as indicated at d, between the flange 23b of the double cone and the nut 24a, so that as indicated in FIG. 17 the double cone can shift not only radially in the direction R, but can also perform an additional tilting movement for example about the edge e of the head portion 2d. This tilting movement may be facilitated by making the flange 23b conical in cross-section as shown in FIG. 17. The arrangement is such that the cap nut 24a (FIG. 18) when screwed up tightly bears on the lugs 38 which engage in the grooves 39, but the above mentioned play is still provided at d.

In the double conical cutter 35b shown in FIG. 17 an inclined aperture is provided in it, the central part of the aperture being cylindrical as indicated at 5d, whereas both end portions of this passage are widened to form a cone 5e. This cone has an acute angle α which is relatively small, preferably 30° to 60°. This conical widening 5e has the advantage on the one hand that the cutting edge does not form a too acute angle which could result in breaking off of the cutting edge particularly when hard metals are used. On the other hand, the cone 5e provides instruction in relation to the final grinding of this conical surface, which grinding may be done with a small electric hand grinder such as is generally available in a factory. This cone 5e thus facilitates in a simple manner the final grinding of the cutting cone 35b. The final grinding of such counter sinking tools previously had to be done in a laborious manner by additionally grinding the undercut conical surface 17.

The invention is not limited to the above-described embodiments. FIGS. 20 and 21 show that there can be employed in a counter-sinking tool according to the invention an exchangeable double cone 35c which does not have a through passage, having instead two holes 5f in the conical surfaces 17 and 17a, these holes being widened out to form cones 5g in the above described manner.

FIGS. 22 and 23 show a further embodiment of the invention comprising a double cone 35d which has two recesses 40 milled out of the conical surfaces 17 and 17a, the recesses 40 forming the cutting edges 34i.

Finally, FIG. 24 shows a double cone 35e which has a plurality of cutting edges 41 on both conical surfaces. The double conical cutters shown in FIGS. 21 to 24 may be secured into a head portion as above described by a screw-threaded connector as shown in FIGS. 12a, 12c or 17.

I claim:

1. A counter-sinking and burr-removing tool, comprising:
   a shaft having a head portion thereon, said head portion having a substantially conical cavity therein;
   a cutting member removably fastened to said head portion, said cutting member being made from a high-grade cutting material and having two conical portions which extend in opposite directions from a common intermediate portion, said conical portions converging in directions away from said intermediate portion, each of said conical portions having at least one cutting edge on its surface, one of said conical portions of said cutting member being received in said conical cavity in said head portion and the other conical portion projecting away from said head portion; and
   means for releasably securing said cutting member to said head portion.

2. A tool according to claim 1, in which the intermediate portion of said cutting member is cylindrical:
   an annular flange projecting radially outwardly from said cylindrical portion, one side of said flange being in engagement with an end surface of said head portion; and
   a threaded collar engaging the other side of said flange and threaded onto said head portion for releasably securing said cutting member to said head portion.

3. A tool according to claim 2, in which said flange has two axial grooves therein on opposite sides of said cutting member, said head portion having two axially projecting lugs which lugs extend into said two grooves.

4. A tool according to claim 3, in which said cutting member has an angular bore extending through both conical surfaces, the axis of said bore intersecting the axis of said cutting member, said head portion having a correspondingly angled through bore which is aligned with said angular bore of said cutting member, and the respective grooves and the corresponding lugs being of different widths so that either of said conical portions can be positioned in said cavity only in such fashion that said through bore and said angular bore will be in alignment.

5. A tool according to claim 2, in which each conical portion has only one cutting edge with a relieved conical surface, and in which said cutting member is held against rotation with respect to said head portion but is radially movable so that during a working operation the axes of said conical portions are displaced with respect to the axis of said head portion and can carry out a circular movement around said last-named axis.

6. A tool according to claim 5, in which said cutting member is supported in said head portion so that it can move both axially and radially so that the axis of said cutting member can carry out with respect to the axis of said head portion a movement lengthwise of the conical surface.

7. A tool according to claim 6, in which said flange of said cutting member has conical axial end faces.

No references cited.

WILLIAM W. DYER, Jr., *Primary Examiner.*

F. S. HUSAR, *Assistant Examiner.*